United States Patent [19]
Berger

[11] Patent Number: 5,191,969
[45] Date of Patent: Mar. 9, 1993

[54] SWITCH ORIENTING DEVICE

[75] Inventor: Fritz Berger, Oberbuchsiten, Switzerland

[73] Assignee: Elektro-Apparatebau Olten AG, Olten, Switzerland

[21] Appl. No.: 301,540

[22] Filed: Jan. 24, 1989

[30] Foreign Application Priority Data

Feb. 1, 1988 [CH] Switzerland ............... 330/88

[51] Int. Cl.$^5$ .............................................. H01H 9/26
[52] U.S. Cl. .................................... 200/296; 200/295
[58] Field of Search ............... 200/236, 286, 295, 296, 200/293, 307; 400/479, 490; 411/88, 87, 93, 94, 96, 134, 135; 224/164, 173, 174, 176, 177, 178, 179; 248/56, 27.1, 27.3; 63/3, 4, 5.1, 7, 9; 59/78, 84, 86, 88, 90

[56] References Cited

U.S. PATENT DOCUMENTS

| | | | |
|---|---|---|---|
| 1,116,910 | 11/1914 | Oexle | 63/5.1 |
| 2,883,496 | 4/1959 | White | 200/296 |
| 3,371,180 | 2/1968 | Frank | 200/296 |
| 3,900,712 | 8/1975 | Fukao | 200/295 |
| 4,010,604 | 3/1977 | Tesch | 59/90 |
| 4,191,872 | 3/1980 | Sorenson | 200/296 |
| 4,564,732 | 1/1986 | Lancaster et al. | 200/307 |
| 4,816,966 | 3/1989 | Frankowski | 200/295 |
| 4,855,972 | 8/1989 | Eiss | 224/173 |

FOREIGN PATENT DOCUMENTS 3302722 9/1983 Fed. Rep. of Germany .

Primary Examiner—Henry J. Recla
Assistant Examiner—Glenn T. Barrett
Attorney, Agent, or Firm—Peter K. Kontler

[57] ABSTRACT

A device for orienting one or more electric switches has one or more plate-like members which can be interlinked at the rear side of a mounting plate in a distributor board. Each member has an opening which can non-rotatably receive the housing of a switch, a recess at one side of the opening and a complementary tongue-like projection at the other side of the opening. The projection of each member can be fully or partially received in the recess of the adjacent member; this renders it possible to alter the mutual spacing of neighboring switches.

11 Claims, 2 Drawing Sheets

SWITCH ORIENTING DEVICE

BACKGROUND OF THE INVENTION

The invention relates to improvements in means for supporting and orienting switches and like objects, particularly in control panels, switchboards, panelboards, distribution boards and other carriers of switches, actuators, circuit breakers and analogous parts.

Published German patent application No. 33 02 722 discloses a switch orienting device which comprises a strip of sheet metal with equidistant openings therein. A drawback of such orienting devices is that the mutual spacing of properly installed switches or like objects cannot be altered, i.e., it is possible to install two neighboring switches at a minimal distance from each other or at a distance which is a whole multiple of the minimal distance. If the mutual spacing of neighboring switches is to depart from m×n, wherein m is the minimal distance and n is a whole number including one, it is necessary to replace the strip with a different strip, i.e., it is necessary to maintain a supply of spare strips.

OBJECTS OF THE INVENTION

An object of the invention is to provide an orienting device which is more versatile than heretofore known orienting devices.

Another object of the invention is to provide and orienting device which is constructed and assembled in such a way that its overall size can be increased or reduced, depending on the number of objects which are to be supported and oriented thereby.

A further object of the invention is to provide an adjustable orienting device which renders it possible to vary the mutual spacing of oriented objects, not only to a whole multiple of a minimum spacing but also to an infinite number of additional positions relative to each other.

An additional object of the invention is to provide novel and improved orienting members for use in the above outlined device.

Still another object of the invention is to provide a device which can simultaneously support two or more different types of switches or other objects.

SUMMARY OF THE INVENTION

The invention is embodied in a device for orienting electric switches and like objects, e.g., on a control panel. The improved orienting device comprises at least one plate-like member having an opening for reception of the housing of a switch or an analogous object therein, a projection (e.g., in the form of a substantially flat square or rectangular tongue) at one side of the opening, and a recess which is complementary to the projection and is disposed at the other side of the opening. In accordance with a presently preferred embodiment, the recess has two halves which are substantially mirror symmetrical to each other with reference to a plane that crosses the plate-like member, and the projection also comprises two halves which are substantially mirror symmetrical to each other with reference to such plane. If the opening has a substantially circular outline, the center of the opening can be located in the symmetry plane.

The plate-like member can be provided with means for preventing rotation of the object in the opening. Such rotation preventing means can comprise at least one key which is receivable in a keyway of an object in the opening.

The orienting device further comprises a mounting plate for the plate-like member. In addition, the orienting device can comprise a second plate-like member which has a projection extending into the recess of the at least one plate-like member and/or a third plate-like member having a recess for the projection of the at least one member. All such members, together with one or more additional members if necessary, are preferably adjustably and separably supported by the mounting plate.

Each plate-like member can have a substantially U-shaped surface which surrounds the respective recess. For example, each member can comprise a first pair of substantially parallel surfaces which flank the recess, and a second pair of surfaces which flank the projection and each of which is aligned with one surface of the first pair. The thickness of each member can be greater in the region of the first pair of surfaces than in the region of the second pair of surfaces. This reinforces the plate-like members around the respective recesses.

The novel features which are considered as characteristic of the invention are set forth in particular in the appended claims. The improved orienting device itself, however, both as to its construction and the mode of assembling and using the same, together with additional features and advantages thereof, will be best understood upon perusal of the following detailed description of certain specific embodiments with reference to the accompanying drawing.

DESCRIPTION OF PREFERRED EMBODIMENTS

Figure 1:
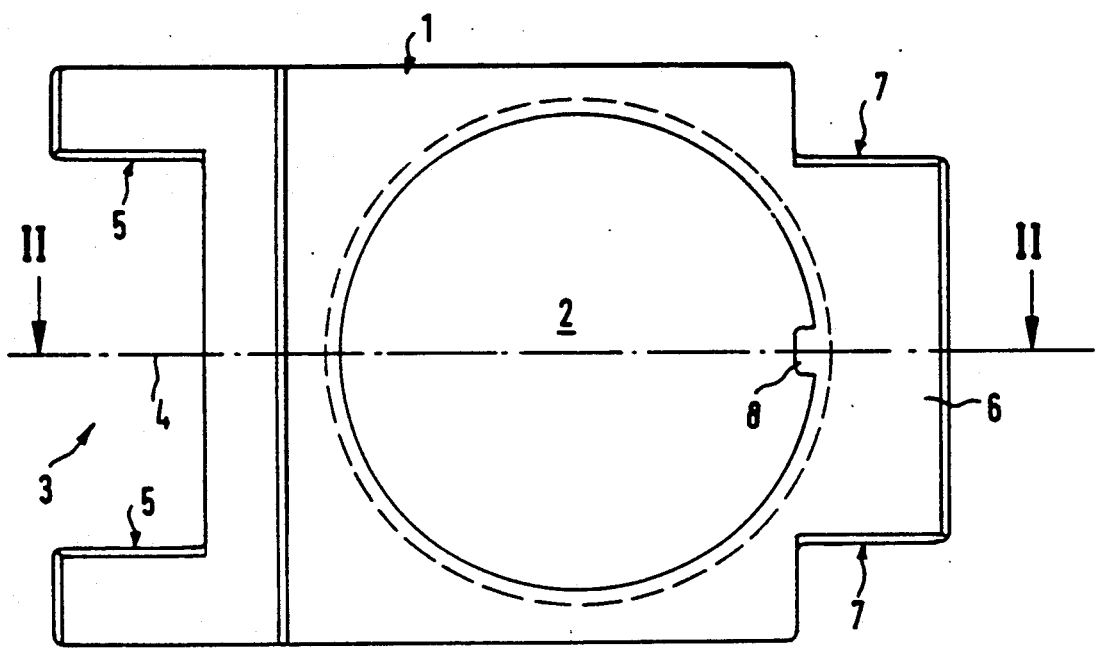
FIG. 1 is a rear elevational view of a plate-like member forming part of the improved orienting device.
Figure 2:
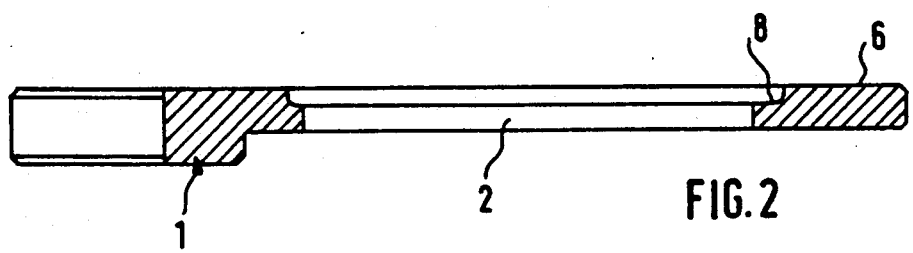
FIG. 2 is a sectional view as seen in the direction of arrows from the line II—II of FIG. 1.

Referring first to FIGS. 1 and 2, there is shown a plate-like member 1 (which can be called an orientation plate) in the form of a substantially rectangular body having a circular opening 2 substantially midway between its longer marginal portions, a flat rectangular tongue-like projection 6 at one side of the opening 2, and a complementary recess 3 at the other side of the opening. Each of two parallel surfaces 5 which flank the recess 3 is aligned with one of two parallel surfaces 7 which flank the projection 6. The surfaces 5 form part of a substantially U-shaped surface which surrounds the recess 3. The projection 6 has two halves which are substantially mirror symmetrical to each other with reference to a plane 4 including the center of the opening 2 and also halving the recess 3, i.e., the recess also comprises two halves which are substantially mirror symmetrical to each other with reference to the plane 4. This plane crosses the member 1 midway between the pairs of surfaces 5 and 7.

Figure 3:
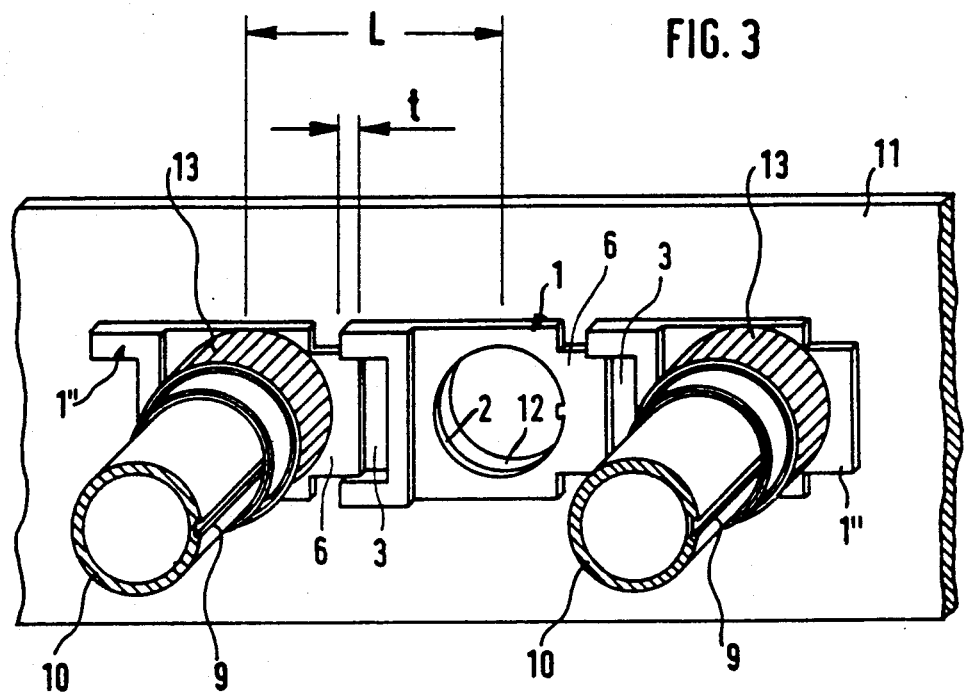
FIG. 3 is a fragmentary perspective view of the rear side of a mounting plate which also forms part of the orienting device and carries three interlinked plate-like members two of which support switches.

As can be seen in FIG. 3, the projection 6 of the member 1 can extend, practically without play, into the complementary recess 3 of an adjacent plate-like member 1', and the recess 3 of the member 1 can receive, practically without play, the projection 6 of a third plate-like member 1". The members 1, 1' and 1" are preferably adjustably and separably supported by a mounting plate 11 which can form part of a control panel, switchboard or the like. It will be noted that each projection 6 resembles or constitutes a tongue which can be slipped into or extracted from the groove (recess 3) of an adjacent plate-like member so that two or more properly assembled members form a file of interconnected switch holders.

The openings 2 of the members 1, 1', 1" can receive the housings of switches 10 which are caused to pass first through the mounting plate 11 and thereupon through the respective members to be thereupon fixed against axial movement by nuts 13 which, when properly applied, engage the exposed rear sides of the respective plate-like members. The enlarged front portions of the switches 10 abut the front side of the mounting plate 11 and can carry depressible buttons, e.g., of the type disclosed in commonly owned U.S. Pat. No. 4,398,075 granted Aug. 9, 1983 to Vogel or in commonly owned U.S. Pat. No. 4,766,306 granted Aug. 23, 1988 to Bichsel et al. In addition, each plate-like member is preferably provided with means for preventing rotation of a switch in its opening 2. As shown in FIGS. 1 and 2, the rotation preventing means can comprise a relatively small key 8 which extends into an axially parallel keyway 9 (FIG. 3) in the housing of the respective switch 10. The configuration of the surface bounding the opening 2 is preferably selected in such a way that the opening can readily receive the housing of a switch 10 wherein the keyway 9 is in line with the key 8 so that the switch 15 housing is surrounded by the respective member 1, 1'or 1" without any, or without appreciable, radial play. Elimination of axial play is ensured by the respective nut 13.

The mounting plate 11 has circular apertures 12 which register with the openings 2 of properly installed plate-like members. The members 1, 1', 1" are installed at the rear side of the mounting plate 11. The apertures 12 can be larger than the openings 2, and two or more apertures 12 can form an elongated slot, as long as such slot permits the housings of two or more switches 10 to pass through the mounting plate 11 and into the openings 2 of the selected plate-like members.

If the mounting plate 11 supports two or more plate-like members, the orientation of all switches which extend through such members is the same because, once the projection 3 of one of two neighboring plate-like members (such as 1, 1' or 1, 1") extends into the recess of the adjacent plate-like member, the orientation of keys 8 on such members is the same so that the switches 10 which extend through the openings 2 of the thus coupled plate-like members must assume predetermined optimum angular positions. For example, all of the keyways 9 can be located in the common symmetry plane of two or more properly coupled plate-like members. The nuts 13 can further serve to urge the front sides of the members 1, 1', 1" against the rear side of the mounting plate 11. In fact, the switches 10 and their nuts 13 can constitute the only means for securing the members 1, 1', and 1" to the mounting plate 11.

As can be seen in FIG. 3, the projections 6 of members 1' and 1 need not be fully received in the recesses 3 of the members 1 and 1", respectively. This Figure shows certain portions (having a width t) of the recesses 3 in the members 1 and 1" remain unfilled, i.e., the distance L between the centers of neighboring openings 2 of the illustrated row of three interfitted members 1, 1' and 1" exceeds the minimum distance. Such adjustability of neighboring plate-like members is desirable and advantageous in many instances, either to compensate for manufacturing tolerances or for other reasons. Of course, it is also possible to install the plate-like members in such a way that the projection 6 of the member 1" is fully received in the recess 3 of the member 1' and/or that the projection 6 of the member 1 is fully received in the recess 3 of the member 1'. The ability of plate-like members to properly orient the respective switches 10 is not affected by the extent to which a projection 6 extends into the adjacent recess 3.

FIGS. 1 to 3 show that the thickness of each plate-like member in the region of the surfaces 5 is greater than in the region of the surfaces 7. In fact, the thickness of the entire portion which defines the recess 3 can exceed the thickness of the remaining portion of the plate-like member, namely of the portion which defines the opening 2 and includes the projection 6. Such reinforcement of members 1, 1', 1" in the regions of their recesses 3 is desirable and advantageous, for example, because it ensures that, when the nuts 13 are applied to bear against the rear sides of the plate-like members, the projections 6 are not expelled from the respective recesses.

Figure 4:
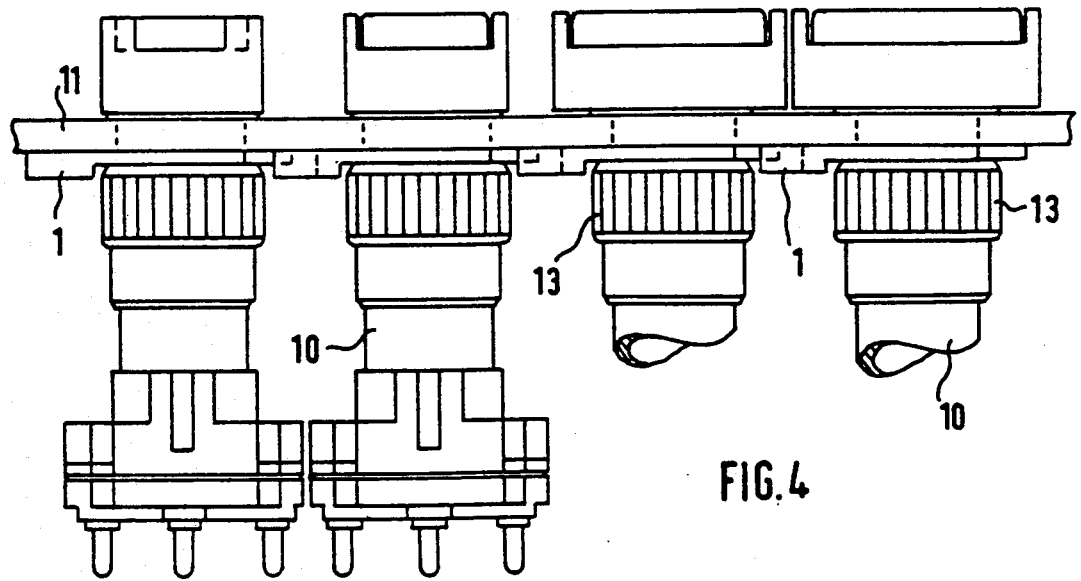
FIG. 4 is a plan view of the orienting device of FIG. 3, showing a total of four plate-like members and two pairs of switches.

FIG. 4 shows that the mounting plate 11 supports four plate-like members and two pairs of different switches.

The members 1-1" and the plate 11 can be made of a metallic, plastic or other suitable material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A device for orienting switches and like objects, comprising at least one plate-like member having (a) an opening for reception of an object therein, (b) a projection at one side of and spaced apart from said opening, (c) a recess complementary to said projection and disposed at another side of said opening opposite said one side and being spaced apart from said opening, (d) a first pair of substantially parallel surfaces flanking said recess, and (e) a second pair of surfaces flanking said projection, each surface of said first pair being aligned with a surface of said second pair, said member further having a first thickness in the region of said first pair of surfaces and a different second thickness in the region of said second pair of surfaces.

2. The orienting device of claim 1, wherein said first thickness exceeds said second thickness.

3. A device for orienting switches and like objects, comprising at least one single plate-like member having (a) an opening for reception of an object therein, (b) a projection spaced apart from and disposed at one side of said opening, and (c) a recess complementary to said projection and spaced apart from and disposed at another side of said opening opposite said one side.

4. The orienting device of claim 3, wherein said recess has two halves which are substantially mirror symmetrical to each other with reference to a plane which crosses said member, said projection having two halves which are substantially mirror symmetrical to each other with reference to said plane.

5. The orienting device of claim 4, wherein said opening has a substantially circular outline and has a center in said plane.

6. The orienting device of claim 3, wherein said member comprises means for preventing rotation of an object in said opening.

7. The orienting device of claim 6, wherein said rotation preventing means comprises at least one key receivable in a keyway of an object in said opening.

8. The orienting device of claim 3, further comprising a mounting plate for said member.

9. A device for orienting switches and like objects, comprising a mounting plate; a first single substantially plate-like member provided on said mounting plate and having (a) an opening for reception of an object therein, (b) a projection at one side of and spaced apart from said opening, and (c) a recess complementary to said projection and disposed at another side of said opening opposite said one side and being spaced apart from said opening; and a second single substantially plate-like member on said mounting plate, said second member having a projection complementary to and extending into the recess of said first member.

10. The orienting device of claim 9, further comprising a third single substantially plate-like member on said mounting plate, said third member having a recess complementary to and receiving at least a portion of the projection of said first member.

11. A device for orienting switches and like objects, comprising at least one single plate-like member having (a) an opening for reception of an object therein, (b) a projection at one side of and spaced apart from said opening, (c) a recess complementary to said projection and disposed at another side of said opening opposite said one side and being spaced apart from said opening, and (d) a substantially U-shaped surface surrounding said recess.

* * * * *